(12) United States Patent
Umansky et al.

(10) Patent No.: US 7,151,614 B1
(45) Date of Patent: Dec. 19, 2006

(54) FACSIMILE (FAX) RELAY HANDLING IN ERROR CORRECTION MODE (ECM)

(75) Inventors: Ilya Umansky, San Jose, CA (US); Neil Joffe, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 748 days.

(21) Appl. No.: 09/586,178

(22) Filed: Jun. 1, 2000

(51) Int. Cl.
*G06F 3/12* (2006.01)
*H04N 1/32* (2006.01)

(52) U.S. Cl. .................... 358/1.15; 358/426.09
(58) Field of Classification Search .......... 358/426.09, 358/426.1, 402, 1.15, 1.14, 401, 404, 406.02, 358/437, 442, 443; 714/18
See application file for complete search history.

(56) References Cited

U.S. PATENT DOCUMENTS

| | | | | |
|---|---|---|---|---|
| 4,058,838 A * | 11/1977 | Crager et al. | ........... | 358/425 |
| 4,918,722 A | 4/1990 | Duehren et al. | ........... | 379/100 |
| 5,291,546 A | 3/1994 | Giler et al. | ........... | 379/100 |
| 5,369,686 A | 11/1994 | Dutra et al. | ........... | 379/94 |
| 5,488,651 A | 1/1996 | Giler et al. | ........... | 379/100 |
| 5,712,907 A | 1/1998 | Wegner et al. | ........... | 379/112 |
| 5,767,985 A | 6/1998 | Yamamoto et al. | ........... | 358/402 |
| 5,805,298 A | 9/1998 | Ho et al. | ........... | 358/402 |
| 5,812,278 A | 9/1998 | Toyoda et al. | ........... | 358/402 |
| 5,838,683 A | 11/1998 | Corley et al. | ........... | 370/408 |
| 5,877,871 A * | 3/1999 | Smith et al. | ........... | 358/442 |
| 5,881,064 A * | 3/1999 | Lin et al. | ........... | 370/389 |
| 6,693,729 B1 * | 2/2004 | Bloomfield | ........... | 358/402 |

FOREIGN PATENT DOCUMENTS

WO    WO 97/18665    5/1997

* cited by examiner

*Primary Examiner*—Douglas Q. Tran
(74) *Attorney, Agent, or Firm*—Marger Johnson & McCollom PC (57) ABSTRACT

An embodiment of the present invention includes a fax communication system for communicating fax information between a first fax machine having error correction capability and a second fax machine. The first and second fax machines are coupled to communicate with one another across a packet switching network. A network device is coupled to received fax information from the first fax machine and accumulates a portion of the fax information and stalls the second fax machine while accumulating the fax information portion until the latter is transmitted to the second fax machine free of errors across the packet switching network. Accordingly, information traffic across the packet switching network is decreased thereby avoiding a network avalanche effect.

17 Claims, 5 Drawing Sheets

FACSIMILE (FAX) RELAY HANDLING IN ERROR CORRECTION MODE (ECM)

BACKGROUND OF THE INVENTION

1. Field of the Invention

The present invention relates generally to the field of facsimile (fax) transmissions in real-time over a packet switching network and particularly to decreasing data traffic over the packet switching network by effectuating error-free fax transmissions over the packet switching network.

2. Description of the Prior Art

With the advent of packet switching networks, it has become efficient, pragmatic and inexpensive to transfer digital information in the form of data, audio and video, over such networks rather than the conventional public switching telephone networks (PSTN), such as conventional telephone lines. Information transmitted over packet switching networks, as the name suggests, is sent in packets. Once transmitted, these packets may be sent to devices located all over the world prior to arriving at their intended destination. The digital information that is to be transmitted is first divided into packets and transmitted over the packet switching network. Subsequently, the packets are appended reassembled to form the original digital information.

A common standard used for transmitting information over a packet switching network is the Transmission Control Protocol/Internet Protocol (TCP/IP) Reference Architecture Model. This standard includes various layers of protocol, the Internet layer of which defines an official packet format.

Figure 1:
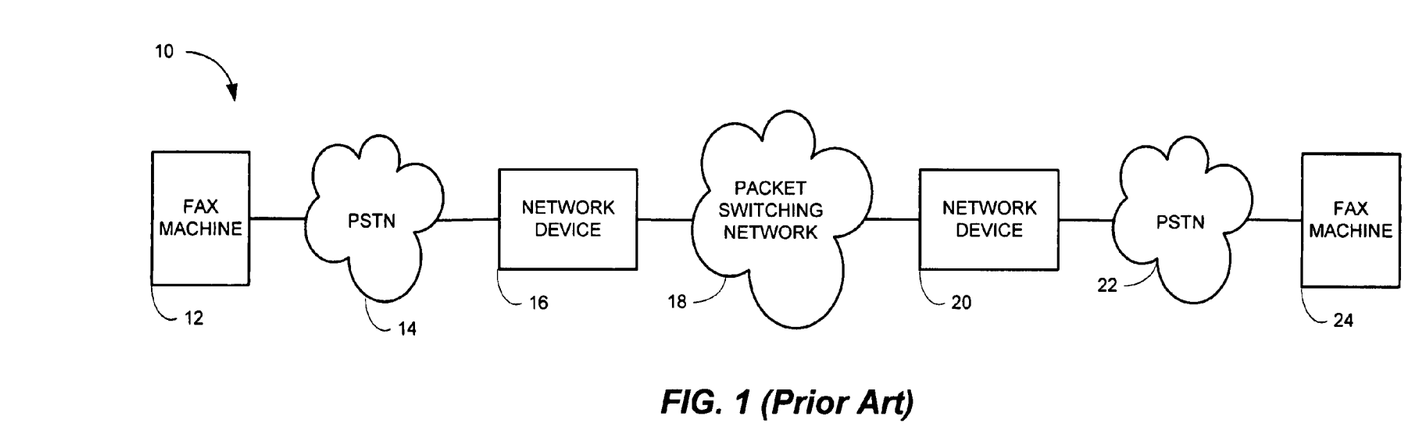
FIG. 1 shows a prior art fax communication system 10.

It has become common practice to transmit fax documents over packet switching network environment, such as the Internet. An example of such a network fax transmission is shown in FIG. 1. In FIG. 1, a prior art fax communication network 10 is shown to include a sending fax device 12, an on-ramp public switching telephone network (PSTN) 14, a sending network device 16, a packet switching network 18, a receiving network device 20, an off-ramp PSTN 22 and a receiving fax device 24. The packet switching network 18 may include many network devices, such as servers, routers and the like, for transferring information in the form of packets from one device to another located all over the world. PSTN 14 and PSTN 22 may be the same network, as conventional public telephone (telco) networks includes devices such as switches and other infrastructure used by the telephone company in routing telephone channels. The sending network device 16 is at times referred to as an "ingress gateway" and the receiving network device 20 is at times referred to as an "egress gateway". Examples of the devices 16 and 20 are routers, access servers, and like network equipment.

In operation, the sending fax device 12, which is typically a fax machine including error correction mode (ECM) for performing correction of errors in the information being transmitted, sends a fax document that typically includes various pages, assembled in blocks, through the PSTN 14 to the network device 16. That is, each page of the fax document is scanned into the sending fax device 12 and is divided into blocks with each block including a number of frames. Each frame typically includes 256 bytes of data.

Each frame is then transmitted over the PSTN 14 to the network device 16. Each frame includes a checksum that is typically in the form of cyclic redundancy code (CRC) for use in verifying the accuracy of the frame information. The receiving fax machine 24 employs cyclic redundancy code (CRC) information to build a map of "good" frames, frames having accurate information and "bad" frames, frames having errors. The structure of the frames of a fax transmission is defined by various standards set by the industry. Examples of these fax transmission standards are T.4, T.6 and T.30. In the example of FIG. 1, frames are transmitted from the fax device 12 to the network device 16 pursuant to any of these standards.

Once the two fax machines, 12 and 24 have negotiated, a common ECM and begin to communicate through the network 18, some errors maybe incurred once fax document are transmitted over the on-ramp PSTN 14 and over the off-ramp PSTN 22 due to the presence of noise in communication lines. Additional errors may occur in the packet switching network 18 in the form of loss of packets, representing actual loss of data. Once the data arrives at the receiving fax machine 24, the receiving fax machine 24 identifies defective frames, if any, by using CRC. The receiving fax machine 24 subsequently requests that the transmitting fax machine 12 retransmit the defective frames. Upon retransmitting the defective frames, more errors may be incurred requiring further retransmission. If retransmission attempts ECM frame results in more ECM frame errors, lower speeds will be negotiated by the fax machines. The problem of transmitting and retransmitting data may continue to the point where the speed between the two fax machines 12 and 24 becomes so slow that the fax transmission begins to fail. The speed has been known to reduce to 2400 bps and finally lead to failure of the fax transmission.

There are only a certain number of times a fax message may be retransmitted. The number of times for retransmission of a fax message depends generally upon the transmitter. For example, commonly in use today, there are typically three to seven retransmission attempts, after which communication between the fax machines is terminated. Furthermore, each time fax data is retransmitted over the packet switching network 18 there is an additional contribution to the congestion in the packet switching network 18. The large number of retransmissions creates an avalanche effect on the traffic in the packet switching network 18, which could slow down the network drastically.

A main cause of congestion in the packet switching network 18, is due to the retransmission of frames that were previously in error during transmission of the fax data. Currently, there are various locations in the communications network 10 in which errors may be incurred during transmission of fax data, i.e. in the PSTN 14, PSTN 22 and the packet switching network 18. If the probability of error in the PSTN 14, PSTN 22 and in packet switching network 18 are denoted by $P_{PSTN}1$, $P_{PSTN}2$ and $P_{IP}$, respectively, then the total probability of error in the communication system 10 is $P_{TOT}=1-(1-P_{PSTN1})(1-P_{PSTN2})(1-P_{IP})$. The formula for $P_{TOT}$ clearly illustrates that multiplicity of potential sources of errors is a major contributor to the overall error in the communications system 10 and consequently to the congestion of packet switching network 18.

In light of the above, the need arises to devise a method whereby ECM maybe implemented between two fax machines communicating across a packet switching network without overloading the latter. The method must be robust to correct errors incurred during transmission of data with minimum utilization of the available bandwidth in packet switching network.

SUMMARY OF THE INVENTION

Briefly, an embodiment of the present invention includes a fax communication system for communicating fax information between a first fax machine having error correction capability and a second fax machine. The first and second fax machines are coupled to communicate with one another across a packet switching network. A network device is coupled to received fax information from the first fax machine and accumulates a portion of the fax information and stalls the second fax machine while accumulating the fax information portion until the latter is transmitted to the second fax machine free of errors across the packet switching network. Accordingly, information traffic across the packet switching network is decreased thereby avoiding a network avalanche effect.

The foregoing and other objects, features and advantages of the present invention will be apparent from the following detailed description of the preferred embodiments which make reference to several figures of the drawing.

DETAILED DESCRIPTION OF THE PREFERRED EMBODIMENTS

Figure 2:
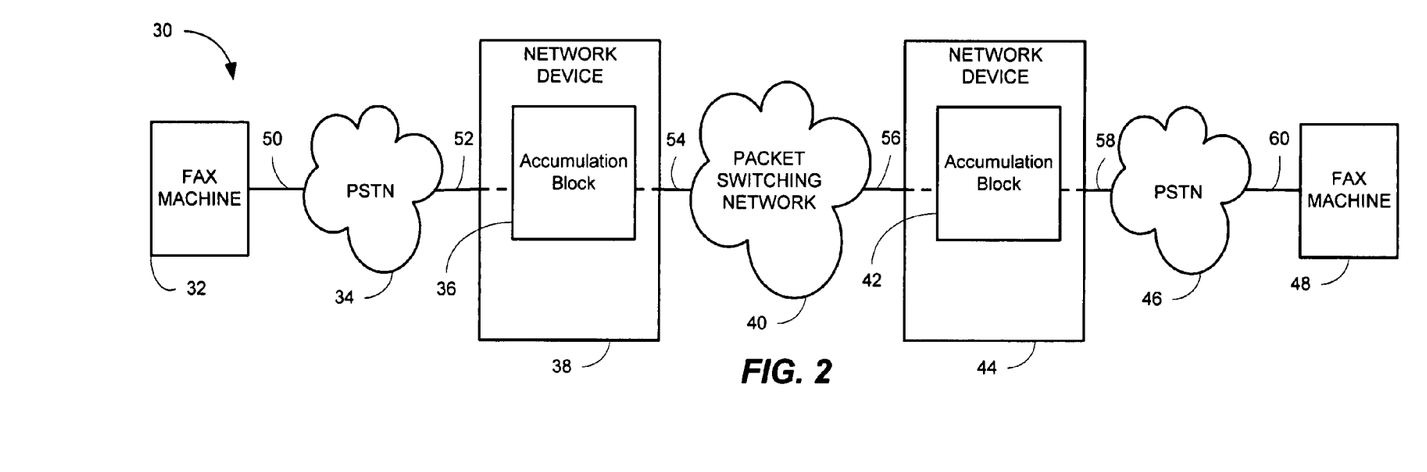
FIG. 2 shows a fax communication system 30 including two network devices 38 and 44, with accumulation blocks 36 and 42.

Referring now to FIG. 2, a fax communication network 30 is shown to include a transmitting fax machine 32 and a receiving fax machine 48. The fax communication system 30 further includes two public switching telephone networks (PSTN) 34 and 46, two network devices 38 and 44 and a packet switching network 40. Examples of network devices 38 and 44 are access servers or routers, manufactured by Cisco Systems, Inc. of San Jose, Calif., specifically models AS5300, c3660, c2600 and c3640. The packet switching network 40, an example of which is the Internet, may employ any network protocol, which allows for packet switching. The TCP/IP protocol is an example of a protocol used to communicate through the Internet.

In the fax communications system 30, the transmitting fax machine 32 is coupled to the PSTN 34 through the transmission line 50 and the PSTN 34 is in turn coupled to the network device 38, through the transmission line 52. The PSTN 34 and 46 may be part of the same network, such as the telephone company public switching network. Examples of the transmission line 52 are T1/E1 lines. These are to be considered exemplars rather than as limitations on the present invention. Network device 38 is coupled to packet switching network 40 through the interface 54. In addition, packet switching network 40 communicates with network device 44 through the interface 56. Network device 44 is coupled to the PSTN 46 through the transmission line 58 which may be for example a T1/E1 line and PSTN 46 is coupled to the receiving fax machine 48 through the interface 60.

Fax communication is initiated with fax machine 32 and is transmitted, in real-time, through the packet switching network 40 to the receiving fax machine 48. Fax machines 32 and 48 are assumed to support ECM for correcting errors during transmission of data. Errors may be incurred during passage of data through PSTN 34 and 46 as well as through the packet switching network 40. In the PSTNs, errors are caused by noisy lines while in the packet switching network, errors occur due to the loss of data packets. Network device 38, through which data passes before reaching the packet switching network 40, is otherwise referred to as the "on-ramp" or "ingress" gateway. Network device 44 through which data is transmitted after having passed through the packet switching network 40, is alternatively known the "off-ramp" or "egress" gateway. Examples of network devices are the Access Server (AS)5300, C3660, C2600, C3640 and the AS 5800 product, all manufactured by Cisco Systems, Inc. of San Jose, Calif.

In one embodiment of the present invention as shown in FIG. 2, the transmitting fax machine 32 divides the page of data intended for fax transmission into various blocks, each block having one or more frames. In one embodiment of the present invention, each block comprises either 64K or 16K bytes of data. In alternative embodiments, a block may be a different size. Fax data is transmitted from fax machine 32, through the PSTN 34, to the network device 38 and is accumulated in accumulation block 36 where one or more frames of a block of data are accumulated in the accumulation block 36. Initially, when the fax information is to be transmitted, a portion thereof, namely at least one or a number of frames of the fax information, is accumulated in the accumulation block prior to being transmitted. For transmissions of frames subsequent to the initial frames, at least one frame is accumulated in the accumulation block prior to being transmitted. The reason for accumulating one frame is for verifying a cyclic redundancy code (CRC) based upon the one frame of information. Error checking and correction is, in part, performed by the fax machine 32 through the latter's ECM capability and through retransmissions between the ingress gateway 38 and the fax machine 32.

The device 38 behaves like a receiving fax machine, performing error correction functions. That is, it checks the CRC in each frame and at the end of a block (in example embodiments, a block is 16K or 64K in size), it requests retransmission of the farmes that were in error. The end result of the error correction process is to correct all the errors within the block and thereby render the block error free. The error free block is subsequently transmitted by the ingress gateway 38 through the packet switching network 40 to the egress gateway 44. The data packets are transmitted through the packet switching network 40 using a reliable protocol so that no packet of data is lost and hence no error is incurred during the transmission through the packet switching network 40. When one block of data is accumulated in accumulation block 42 of the egress gateway 44, the block of data is transmitted to the receiving fax machine 48 via the PSTN 46. Error correction by way of the fax machine 48's ECM capability and retransmissions between the egress gateway 44 and the fax machine 48 is then performed between the egress gateway 44 and the receiving fax machine 48 until the transmitted block received by the receiving fax machine 48 is error-free.

One of the features of the error correction technique used by the present invention described hereinabove is its local character. That is, rather than performing error correction from one end of the communication system 30 to its other end, as is currently practiced, error correction is performed on different segments of the communication system 30 separately. The advantage of this method lies in the fact that only error-free data being transmitted between the ingress gateway 38 and the egress gateway 44 are transmitted, through the packet switching network 40, thereby avoiding congestion of the packet switching network 40. In the current method of error correction, detection of an error leads to retransmission of data across the packet switching network, creating congestion in the latter and resulting in the slowdown of the packet switching network. However, according to one embodiment of the present invention, retransmission of fax data caused by the presence of errors is performed either between the transmitting fax machine 32 and the ingress gateway 38 (on the sending side of the system 30) or between the egress gateway 44 and the receiving fax machine 48 (on the receiving side of the system 30). Only error free (or nearly error-free, that is, to the extent CRC allows for error-free transmission) fax data is transmitted across the packet switching network 40 thereby avoiding congestion of the packet switching network 40 while utilizing a minimum amount of bandwidth in transmitting the data.

Fax data is transmitted across the packet switching network 40 using a reliable protocol. The use of reliable protocol ensures that no loss of data packet is incurred during transmission. A well-known reliable protocol used for transmitting data packets is the Transmission Control Protocol (TCP). Alternatively, other reliable protocols could be used instead, such as proprietary protocols. One example of such a proprietary protocol is Reliable User Datagram Protocol (RUDP), supported by products sold by Cisco Systems, Inc. located in San Jose, Calif. Any one of these protocols or others known to those in the industry may be employed, in the present invention, for transmission of fax information across the packet switching network 40.

As mentioned hereinabove, the transmitting fax device divides a page of fax data into blocks of data, each of which may consist of 64K or 16K bytes of data. Each block includes High-Level Data Link Control (HDLC) encoded data. Furthermore, each block is divided into frames, each of which in one embodiment of the present invention, comprises 256 bytes of data. The frames are transmitted by the fax machine 32 and received at the ingress gateway 38. If the arriving frame is error-free, the ingress gateway 38 transmits the frame to the packet switching network 40. However, if an arriving frame is defective, the ingress gateway waits for the entire block to accumulate before a request is sent to the transmitting fax machine 32 for retransmission of the defective frames. At the egress gateway, as error-free frames arrive, they are transmitted to the receiving fax machine. If some of the frames are missing, the egress gateway generates a dummy frame with CRC error and transmits the same in place of the actual (and defective or missing) frame. After all of the frames of the block have been transmitted, the receiving fax machine requests retransmission of all of the frames received in error. Thus, the egress gateway retains all of the frames of the block until it receives confirmation from the receiving fax machine.

The ingress gateway 38 and the receiving fax machine 48 distinguish error-free frames from defective ones by employing a checksum that is generally in the form of cyclic redundancy code (CRC) and is carried on for every frame. Upon detecting a defective frame, the ingress gateway 38 and/or the receiving fax machine 48 request retransmission of the defective frame from the sending fax machine 38 and/or the egress gateway 44 until an entire error-free block of data is constructed. In this manner, error-free transmission of fax information is communicated between two fax machines through a packet switching network in real-time.

When the transmitting fax machine 32 initiates fax communication by dialing into the receiving fax machine 48, the latter typically expects to receive data within the next 15 to 20 seconds, otherwise connection may be terminated between the two fax machines. Thus, if it takes more than 15 to 20 seconds to accumulate data within the ingress gateway 38, the latter can stall the receiving fax machine 48 until enough data has accumulated in the accumulation block 36. Transmission of a single block consisting of 64K bytes of data at a rate of 14.4K bps which is equivalent to 1800 bytes/sec takes approximately 34 seconds thereby necessitating stalling of the receiving fax machine 48.

In order to keep the communication line alive, stalling the receiving fax machine 48 may be achieved in a number of ways. For instance, the ingress gateway 38 may transmit a cover page to the receiving fax machine 48 in order to gain more time for data to accumulate in the accumulation block 38. Alternatively, commands and/or flags may be exchanged between the ingress gateway 38 and the receiving fax machine 48 in order to stall the latter until enough data has been accumulated. The process of stalling the receiving fax machine 48 is sometimes referred to as "spoofing". Upon accumulating one or more frames, the ingress gateway 38 transmits the accumulated data across the packet switching network 40 to the egress gateway 44. The egress gateway 44 then transmits the accumulated data to the receiving fax machine 48.

Generally, fax machines with ECM capability necessarily include memory for storing a block of fax data for possible retransmission thereof. Upon receiving defective frames, the ingress gateway 38 requests retransmission of the defective frames from the fax machine 32. The fax machine 32 performs error correction on the defective frames and transmits the corrected frames to the ingress gateway 38. Subsequently, the receiving fax machine 48, receives virtually error-free block of frames containing fax data through the network and from the egress gateway 48.

There are other advantages in working with blocks of smaller size than 64K. An example of a smaller block size is the 16K byte block. For example, it takes less time to accumulate 16K bytes of data than it takes to accumulate 64K bytes. Thus, system efficiency increases with smaller block size. In addition, the receiving fax device has an easier time reading the contents of the 16K byte block due to the shorter length of the block. Shorter block sizes are further desirable for synchronization between transmission of blocks during negotiations between a gateway and the fax machine with which it is directly communicating. The T.30 protocol mentioned hereinabove has the flexibility of allowing the ingress gateway 38 to request data from the fax machine 32 in shorter blocks such as 16K blocks.

In FIG. 2, the network devices 38 and 44 each include a processor (or computer medium), such as the CPU 64 (shown in FIG. 3), and some type of storage area, a computer readable medium, for storing software programs for carrying out the various functions discussed herein. The processor executes code from the computer readable medium for effectuating the functions discussed herein.

Figure 3:
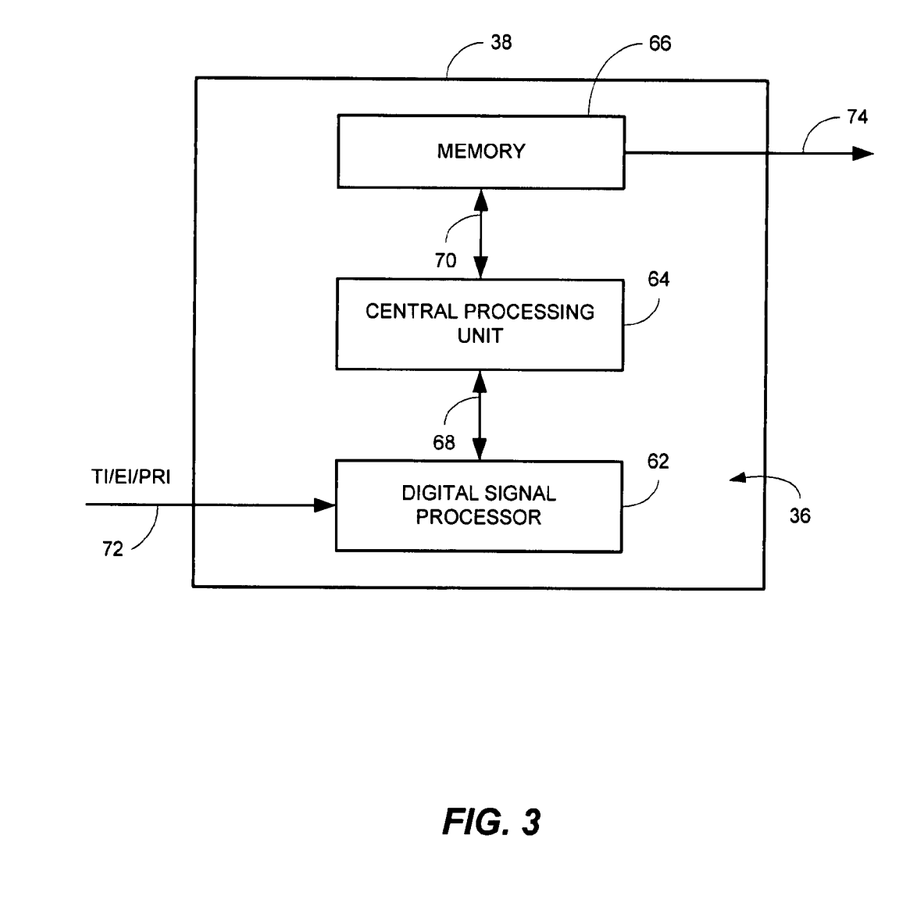
FIG. 3 shows various components of the accumulations block of the network device 38.

Referring now to FIG. 3, one implementation of the accumulation block 36 is shown to include digital signal processor (DSP) 62, central processing unit (CPU) 64 and memory 66. The DSP 62 communicates with the CPU 64 through the interface 68 and CPU 64 is in communication with memory 66 through the interface 70.

Fax data arrives at DSP 62 after having been transmitted from the sending fax machine 32 and having passed through the PSTN 34. In one embodiment of the present invention, fax data arrives at DSP 62 through either a T1/E1 line or other trunk types. As a part of various functions that it performs, the DSP 62 functions as a fax modem performing modulation/demodulation on the fax data by implementing various fax modulation protocols such as V.21, V.29, V.33, etc. Fax modulation protocols are used in sending fax documents in accordance with protocols such as T.30 and T.4/T.6. Fax transmission protocols, in turn, are employed for the transmission of fax messages and include fax information such as the actual contents of the fax page, the size of the fax page, the type of compression employed on the fax data and the like. While functioning as a fax modem, the DSP 62 establishes communication with the fax machine 32 in the same way as two fax machines communicate with each other.

Fax data is accumulated in the CPU 64 until an entire block of data or certain number of frames thereof have been received. The CPU 64 subsequently divides the fax data into packets and transmits the packetized fax data to the memory 66. A software program, through execution thereof by the CPU 64 or the DSP 62, causes reading of the memory 66 and transmits data received from the CPU 64 to the packet switching network 40 (shown in FIG. 2) using a reliable protocol such as TCP.

The direction of transmission of data may be reversed so that fax information is sent by the fax machine 48 and received by the fax machine 32 (in FIG. 2). In this case, in FIG. 3, data arrives at the device 38 through the line 74 and leaves through the line 72, in which case, the device 38 acts as an egress gateway. In an egress gateway, after arrival of data in the form of IP packets, the data is stored in memory. The IP packets are subsequently transferred to the CPU wherein the IP packets are depacketized or appended to form the original fax data. Upon accumulating of a block of data or certain number of frames thereof, the CPU transfers the accumulated data to the DSP 62 wherein modulation is performed thereon by implementing fax modulation protocols. Subsequently, the DSP 62 transmits data to the receiving fax machine.

Figure 4:
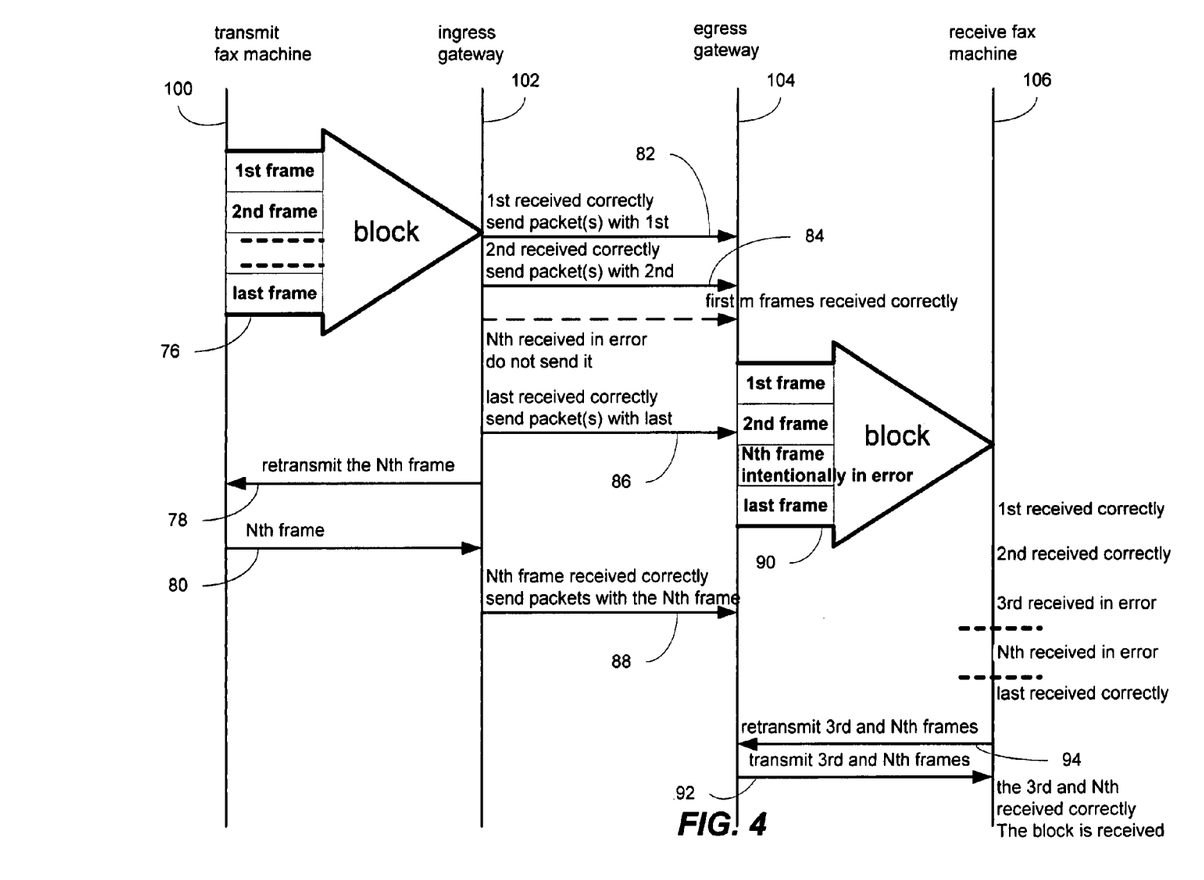
FIG. 4 shows a timing diagram illustrating various steps in the transmission of one block of fax information according to one embodiment of the present invention.

FIG. 4 illustrates a time diagram outlining various stages of data transmission from the transmitting fax machine 32 to the receiving fax machine 48. Time is shown to increase from the top of the figure to the bottom. The vertical lines 100, 102, 104 and 106, indicate various stages in the transmission of the fax data, corresponding to the transmitting fax machine 32, the ingress gateway 34, the egress gateway 44 and the receiving fax machine 48, respectively.

Initially, the transmitting fax machine 32 transmits a block of data comprising several frames to the ingress gateway 38. The first frame, second frame and the last frame are received at the ingress gateway 38 successfully and transmitted therefrom to the egress gateway 44, as indicated by the arrows 82, 84, and 86, respectively, in FIG. 4. However, the Nth frame is found to be defective upon arrival at the ingress gateway 38 and hence the latter requests a retransmission of the Nth frame from the transmitting fax device at a later time as indicated by the arrow 78.

Transmission of the frames from the ingress gateway 38 to the egress gateway 44 is through the packet switching network 40 without any loss. Hence the whole block of data is recovered at the egress gateway 44 except for the Nth frame. At this point, in order to stall the receiving fax machine 48, a spoofing technique is employed whereby a dummy frame is substituted for the defective Nth frame. The dummy frame is not transmitted over the packet switching network; it is only transmitted over the PSTN. The size of the dummy frame is the size of a standard frame, such as 256 or 64 bytes. The checksum of the dummy frame is incorrect. The substituted frame intentionally includes some errors and is merely substituted in block 90 along with other error-free frames in order to stall the receiving fax machine 48 and to keep the fax communication alive until such time as when the Nth frame is retransmitted without any errors.

At a later time, the Nth frame is retransmitted by the transmitting fax machine 32, as indicated by the arrow 80. The Nth frame is received at the ingress gateway 38 with no errors and subsequently transmitted to the egress gateway 44, as indicated by the arrow 88. Meanwhile, block 90 has arrived at the receiving fax machine 48 where all of the frames are received with no error except for the third and Nth frames wherein some intentional errors were introduced. Consequently, the receiving fax machine 48 requests retransmission of the third and Nth frames as indicated by the arrow 94. Retransmission of individual frames is requested by the receiving fax machine 48 after the entire block (in an example embodiment, a block is 16K or 64K in size) has been transmitted. The egress gateway 44, having received the Nth frame with no errors, retransmits the 3rd and the Nth frames as indicated by the arrow 92. The receiving fax machine 48 receives the third and the Nth frames with no error, thereby completing the successful transmission of the entire block 76 from the transmitting fax machine 32 to the receiving fax machine 48.

Figure 5:
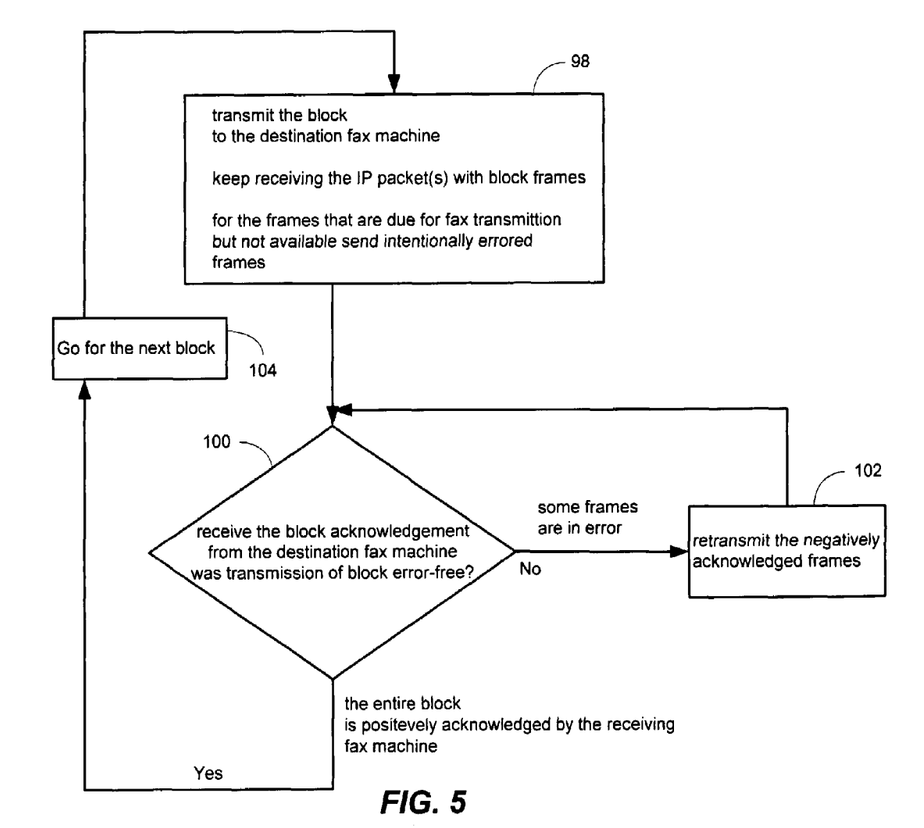
FIG. 5 shows a block diagram of the software reading in the network device 44 according to one embodiment of the present invention.

FIG. 5 depicts a flowchart of the software implemented in the egress gateway 44 according to an embodiment of the present invention. In alternative embodiments, the same may be achieved by the use of hardware. At step 98, a block of data, comprising several frames, is transmitted by the egress gateway to the destination fax machine. In order to stall the destination fax machine, a spoofing technique is employed wherein for the blocks that are due for fax transmission but have not yet arrived; other blocks with intentionally introduced errors are transmitted. Upon receiving the block the destination fax machine sends an acknowledgement to the egress gateway as shown in Step 100. Within the acknowledgement, it is indicated whether the transmission of the block was error-free or errors have been incurred by some frames during the transmission. In the latter case, the egress gateway retransmits the frames that were deemed defective as indicated in Step 102. Another acknowledgement regarding the newly transmitted frames is received by the egress gateway and the process continues until the entire block has been received by the destination fax machine with no errors. At this point, the next block of data is transmitted by the egress gateway, as indicated in Step 104. The process continues in this way until all the blocks within the fax data have been received successfully by the destination fax machine.

One aspect of the present invention lies in the local character of the error correction—i.e. error correction is performed at either end of the packet switching network. The local character of error correction is evident from FIG. 4 wherein the retransmission of data, represented by the arrows 78 and 94 pointing in the reverse direction, takes place between the transmitting fax machine 32 and the ingress gateway 38 on the one hand and the egress gateway 44 and the receiving fax machine 48 on the other hand. Thus, no multiple retransmissions of data takes place across the packet switching network thereby preventing an avalanche effect in the traffic across the packet switching network. The avalanche effect experienced at times by current systems is evident when a user of a personal computer attempts to make a connection to the Internet through a browser. It may happen that the user is left with no response for an extended period of time mainly due to multiple retransmissions of data across the Internet required by the current method of error correction.

The main advantage of the present invention lies in the significant reduction of load across the packet switching network due to elimination of multiple retransmissions of data for error correction. Hence, no data corruption or loss of data is experienced across the packet switching network due to elimination of avalanche effect in the traffic across the packet switching network. The avalanche effect currently plaguing the packet switching networks is mainly due to numerous retransmissions of data across the packet switching network for purposes of error correction. The present invention overcomes the current limitations by removing any retransmissions of data for the purposes of error correction from the packet switching network and relegating the error correction to devices on either side of the packet switching networks.

Figure 6:
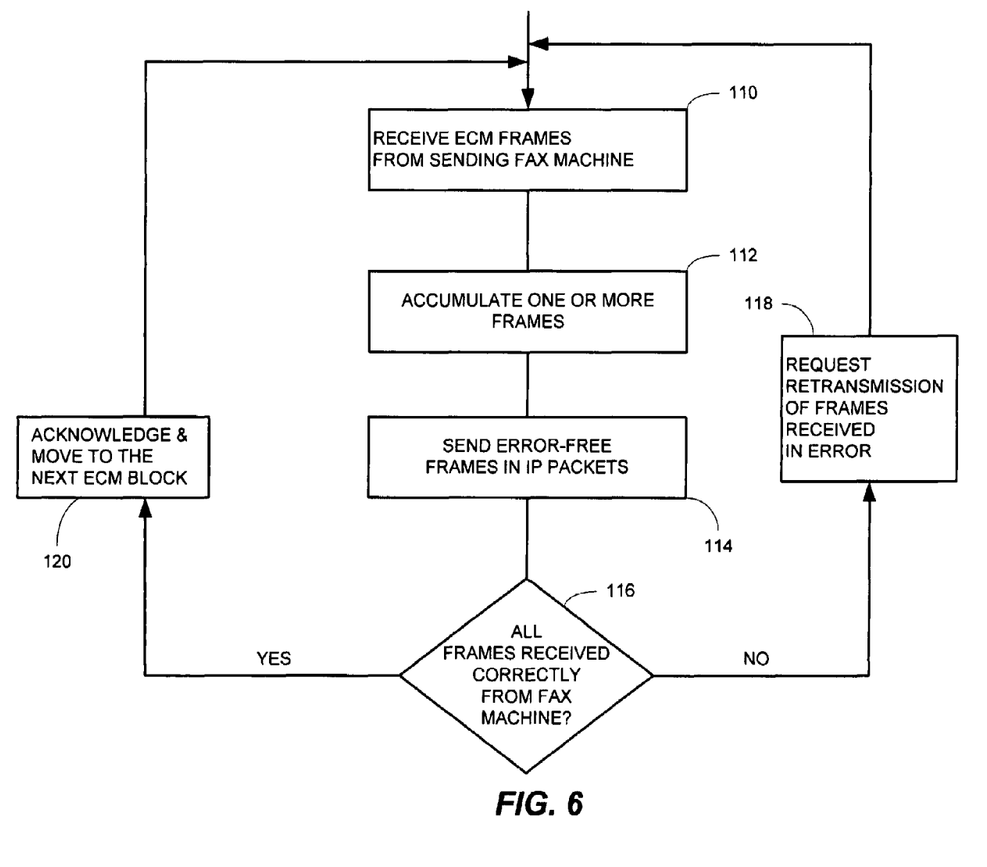
FIG. 6 shows a block diagram of the software reading in the network device 38 according to one embodiment of the present invention.

FIG. 6 depicts a flowchart of the software implemented in the ingress gateway 38 according to an embodiment of the present invention. In alternative embodiments, the same may be achieved by the use of hardware. At step 110, the ingress gateway 38 receives frames of fax information from the sending fax machine 32. Next, at step 112, one or more frames are accumulated. At step 114, error-free frames are transmitted by the ingress gateway 38, in IP packet form, across the packet switching network 40. At 116, frames that are being received from the sending fax machine are checked as to whether or not they have been correctly received. If they have been correctly received, step 120 is performed at which time the correctly received frames are acknowledged vis-à-vis the sending fax machine and frames of the next block are processed. If the received frames are not correctly received, step 118 is performed, requesting, from the sending fax machine, retransmission of frames received in error.

It should be noted that the time for transmission from a sending fax machine to a receiving fax machine, through a network, in accordance with the present invention is not increased relative to prior art methods and apparatus.

Although the present invention has been described in terms of specific embodiments it is anticipated that alterations and modifications thereof will no doubt become apparent to those skilled in the art. It is therefore intended that the following claims be interpreted as covering all such alterations and modification as fall within the true spirit and scope of the invention.

What is claimed is:

1. A fax communication, comprising:
   a first fax machine;
   a second fax machine to establish a communication path with the first fax machine;
   a network device to accumulate a portion of the fax information received from the first fax machine over a public switching telephone network after the communication path is established, to detect errors in the accumulated portion of the fax information using cyclic redundancy code (CRC) error checking and correction, to stall the second fax machine responsive to detecting errors in the accumulated portion of the fax information, and to send the accumulated portion of the fax information across the packet switching network to the second fax machine responsive to detecting no errors in the accumulated portion of the fax information.

2. A system as recited in claim 1 wherein the fax information is transmitted between the first fax machine and the second fax machine in real-time.

3. A system as recited in claim 1 wherein the stalling signal is in the form of a fax cover page.

4. A system as recited in claim 1 wherein the stalling signal is a nonfunctional command.

5. A system as recited in claim 1 wherein the stalling signal is invalid data.

6. A system as recited in claim 1 wherein the fax information includes fax pages with each page comprising one or more blocks having one or more frames and further wherein the network device for accumulating one or more frames of a block, within the accumulation block, as the accumulated portion of fax information.

7. A system as recited in claim 1 wherein the network device is a router.

8. A system as recited in claim 1 wherein the network device further for detecting errors in the accumulated portion of the fax information, for retransmitting the accumulated portion back to the first fax machine, for receiving the accumulated portion, error-free, and for transmitting the error-free portion through the packet switching network to the second fax machine thereby minimizing retransmissions of the portion or any sub-portion thereof of the fax information through the packet switching network to avoid an avalanche effect.

9. A system as recited in claim 1 wherein the network device further includes a digital signal processor for modulating/demodulating the fax information.

10. A system as recited in claim 9 wherein the network device further includes a central processing unit, coupled to the digital signal processor, for accumulating the fax information and for forming from the fax information.

11. A system as recited in claim 10 wherein the network device further includes a memory coupled to the central processing unit for storing the fax information and software means for reading the stored fax information and for transmitting the fax information through the packet switching network.

12. A system as recited in claim 1 wherein the network device is responsive to the fax information received from the first fax machine through an interface defined by the TCP/IP protocol.

13. A system as recited in claim 1 wherein the network device is coupled to the first fax machine through a public switching telephone network.

14. A system as recited in claim 1 wherein the network device is coupled, through the packet switching network, to a receiving network device, coupled to the second fax machine, the receiving network device for transmitting the fax information to the second fax machine and upon detection of errors within the fax information, for receiving a retransmission of the fax information from the second fax machine and repeating retransmissions until the fax information is transmitted, error free, to the second fax machine.

15. A method for transmitting fax information between a first fax machine having error correction capability and a second fax machine, the first and second fax machines being coupled to communicate with one another across a packet switching network, in the form of packets organized into frames, comprising:
   establishing a communication path between the first and second fax machines;
   receiving fax information over a public switching telephone network from the first fax machine;

accumulating at least one frame being a portion of the fax information;

performing error checking and correction using cyclic redundancy code (CRC) on the at least one frame;

stalling the second fax machine while accumulating the portion of fax information; and transmitting, to the second fax machine, the accumulated portion of fax information, free of errors, across the packet switching network thereby avoiding re-transmission of the portion or any sub-portions thereof across the packet switching network.

16. A method as recited in claim 15 further including the steps of detecting errors in the accumulated portion of the fax information, retransmitting the accumulated portion back to the first fax machine, receiving the retransmitted portion and transmitting the received retransmitted portion free of errors across the packet switching network.

17. An apparatus:

a means for establishing a communication path between a first and second fax machine;

a means for receiving fax information over a public switching telephone network from the first fax machine;

a means for accumulating at least one frame being a portion of the fax information after establishing the communication path;

a means for performing error checking and correction using cyclic redundancy code (CRC) on the at least one frame;

a means for stalling the second fax machine while accumulating the portion of fax information; and a means for transmitting, to the second fax machine, the accumulated portion of fax information, free of errors, across the packet switching network thereby avoiding re-transmission of the portion or any sub-portions thereof across the packet switching network.

* * * * *